(12) United States Patent
Lightfoot et al.

(10) Patent No.: US 6,912,485 B2
(45) Date of Patent: Jun. 28, 2005

(54) SIGNAL HANDLING AND PROCESSING

(75) Inventors: John Adrian Lightfoot, Calderbridge (GB); Neil Pritchard, Calderbridge (GB); David John Strawbridge, Calderbridge (GB); David Bailey, Calderbridge (GB); Robert Johnathan Sharpe, Calderbridge (GB); John Paul Ronaldson, Calderbridge (GB)

(73) Assignee: British Nuclear Fuels plc, Risley (GB)

( * ) Notice: Subject to any disclaimer, the term of this patent is extended or adjusted under 35 U.S.C. 154(b) by 0 days.

(21) Appl. No.: 10/318,507

(22) Filed: Dec. 13, 2002

(65) Prior Publication Data

US 2005/0015219 A1 Jan. 20, 2005

Related U.S. Application Data

(63) Continuation of application No. 09/564,566, filed on May 4, 2000, now abandoned.

(30) Foreign Application Priority Data

May 4, 1999 (GB) .............................................. 9910174

(51) Int. Cl.[7] ................................................ G06F 7/14
(52) U.S. Cl. ....................... 702/188; 702/179; 702/186; 702/189
(58) Field of Search ............................ 702/8, 117, 179, 702/188, 190; 250/253, 366, 367; 340/853.7, 854.4; 709/201, 224

(56) References Cited

U.S. PATENT DOCUMENTS

| | | | |
|---|---|---|---|
| 3,792,470 A | | 2/1974 | Donovan et al. |
| 3,902,478 A | | 9/1975 | Konopasek et al. |
| 4,391,646 A | * | 7/1983 | Howell ........................ 523/219 |
| 4,396,976 A | * | 8/1983 | Hyatt ............................ 700/1 |
| 4,402,054 A | * | 8/1983 | Osborne et al. ............ 702/181 |
| 4,568,514 A | | 2/1986 | Lingren et al. |
| 4,677,300 A | * | 6/1987 | Tawil et al. ................. 250/366 |

(Continued)

OTHER PUBLICATIONS

G.J. Arnone, *A New Pulse Arrival–Time Recording System*, IEEE, Jan. 1997, pp. 40–43.

G.J. Arnone, et al., *A New Pulse Arrival–time Recording Module for analyzing Neutron Multiplicities*, 1992 IEEE Nuclear Science Symposium, Oct. 1992.

M. Bruggeman, et al., *Non–Destructive Assay with Computed Neutron Coincidence Counting*, Conference: Radioactive Waste Products–International Seminar; 3rd Schriften–Forschungszentrum Julich Reihe, 1998; vol. 2, pp. 253–256.

Guide Technology Incorporated, *Mechanical System Measurements Using the GT650 Series Time Interval Analyzers*, May 30, 1994.

Guide Technology Incorporated, *GT657, GT659 16–CH. Time Interval Analyzers*, Jul. 29, 1997.

*Primary Examiner*—Patrick Assouad
*Assistant Examiner*—Felix Suarez
(74) *Attorney, Agent, or Firm*—Workman Nydegger

(57) ABSTRACT

An event monitoring system has a plurality of detector units for detecting neutrons or other emissions from radioactive materials (i.e., events). At least one of the detector units has a detector for the events and an amplifier to amplify signals generated by the detector. A signal handler receives the amplified signals and an adder adds to the signals an indication of the detector unit from which the signals originated. A combiner combines the signals. A serial link conveys the combined signals from the signal handler to a signal processor which includes a signal receiver for the combined signals. A time stamper applies to the signal an indication of time of the generation of the signal by the detector unit, and a computer processes the signals, including the time and detector unit indications, using software to produce information on the signals or events they represent.

21 Claims, 9 Drawing Sheets

U.S. PATENT DOCUMENTS

| | | | | |
|---|---|---|---|---|
| 4,931,646 A | * | 6/1990 | Koechner et al. | 250/367 |
| 4,988,988 A | * | 1/1991 | Kimura | 340/825.06 |
| 5,005,142 A | * | 4/1991 | Lipchak et al. | 376/245 |
| 5,347,129 A | * | 9/1994 | Miller et al. | 250/336.1 |
| 5,399,869 A | * | 3/1995 | Usuda | 250/486.1 |
| 5,430,663 A | * | 7/1995 | Judd et al. | 364/550 |
| 5,854,994 A | * | 12/1998 | Canada et al. | 340/3.63 |

* cited by examiner

SIGNAL HANDLING AND PROCESSING

CROSS-REFERENCE TO RELATED APPLICATIONS

This application is a continuation of U.S. patent application Ser. No., 09/564,566 filed May 4, 2000, now abandoned, which claims priority to Great Britain Application No. 9910174.3, filed May 4, 1999, which applications are incorporated herein by specific reference.

BACKGROUND OF THE INVENTION

1. The Field of the Invention

This invention concerns improvements in and relating to signal handling and processing, particularly, but not exclusively systems for handling and processing signals arising from radiation monitoring systems.

2. The Relevant Technology

A wide variety of radiation monitoring systems are known for a great range of purposes. These include systems for detecting alpha emissions, beta emissions, gamma emissions or neutron emissions. Detection may be effected directly, for instance by the interaction of the emitted form with a detector, or indirectly, for instance through a by-product of the emitted form interacting with a detector.

Due to the different emissions being detected by each instrument, the different purpose of each instrument, the different environment in which each instrument is to be deployed and the different manner of each instrument's operation, existing instruments are designed specific for their application and have internal structures and modes of operation which are accordingly specific.

Additionally, when making instruments for radiation monitoring, or monitoring of other potentially hostile environments, existing systems invariably seek to minimize the amount of equipment in or close to the hostile environment and remove as much as possible of the equipment away from the hostile environment to more convenient locations. Thus whilst the detector unit for generating the signals may be placed in close proximity to the hostile environment, the signal handling apparatus, such as amplifying and discriminating units, and the processing apparatus, such as counters, data processors and result presentation units, are removed as far from the hostile environment of the detectors as reasonably possible.

SUMMARY OF THE INVENTION

Amongst its aims, the present invention seeks to provide a monitoring system suitable for ready adaption to monitoring a variety of different emission types and/or emissions in a variety of different situations. The invention also has amongst its aims reducing the costs and degree of specifity of the instrument's design.

According to a first aspect of the invention, we provide an event monitoring system, the event monitoring system comprising a plurality of detector units for the events, each detector unit generating an output signal in response to an event detected by that detector;

signal handling means which receive as signal inputs the signal outputs of the detector units and generate signal handling means signal outputs; and signal processing means which receive as signal inputs the signal outputs of the signal handling means, the signal processing means processing the signals and generating an output indicative of a characteristic of the events being monitored;

wherein the signal handling means include means to add to the signal outputs of the detector units an indication of the detector with which the signal originated, the combined signal forming the signal handling means signal output.

According to a second aspect of the invention we provide an event monitoring system, the event monitoring system comprising:

a plurality of detector units for the events, each detector unit generating an output signal in response to an event detected by that detector;

a signal handler which receives as signal inputs, the signal outputs of the detector units and generates signal handler signal outputs; and a signal processor which receives as signal inputs the signal outputs of the signal handler, the signal processor processing the signals and generating an output indicative of the characteristic of the events being monitored;

wherein the signal handler includes an indication adder to add to the signal outputs of the detector units an indication of the detector unit from which the signal output originated, the combined signal forming the signal handler signal output.

In this way the signal outputs from the signal handling means/signal handler can be combined or otherwise handled and processed, whilst retaining the possibility of discriminating which detector unit the signal arose from.

One or more of the detector units may comprise an event detector, the event detector being capable of generating an electrical output in response to an event, the detector unit further comprising a signal amplifier capable of amplifying the detector output, the amplified output forming the detector unit output.

Preferably the event is an emission of a type associated with radiation.

The detector unit output may be an analogue signal.

Preferably the signal amplifier is provided in close proximity with the detector to form the detector unit. Close proximity may be with a link, such as an electrical conductor link, between the two, the link length being less than 1 meter, preferably less than 50 cm and ideally less than 15 cm, particularly where the link is not to be super-screened. Link lengths of 15 m or less may be used where super-screened links are employed. It is particularly preferred that the amplifier is mounted on the detector to form the detector unit. The mounting may be effected by a threaded portion on the detector and corresponding threaded portion on the amplifier.

Preferably each detector is provided with its own amplifier.

Preferably the amplifier has one or more, most preferably all of, a connector for signal output, a connector for receiving signal input from the detector, a connector for receiving low tension power input and a connection for receiving high tension power input. In one embodiment the signal input is provided on one end of the amplifier, with the signal output, low tension input and high tension input provided on the opposing end of the amplifier.

The amplifier may be connected to other components in a monitoring system for the events via an electrical connector. Preferably the amplifier is so connected to signal handling means. Preferably the connector is attached to the amplifier through a screw thread connection, the screw thread on the amplifier corresponding to the screw thread on the electrical connection. Preferably a signal electrical connector is provided, most preferably with means for conveying the signal output, low tension power input and high tension power input. The electrical connector may be a multi-core cable.

One or more, preferably all of the detector units, may be provided with signal branching capability and/or parallel outputs and/or inputs. The outputs may be used for monitoring the operation of the detector unit. One or more parallel links may be provided for system diagnostics purposes and/or for safeguard verification and/or authentication purposes and/or for linking to other event monitoring systems or parts thereof. One or more parallel inputs to receive detector type signals, generated other than by the detectors, and/or other forms of test signal may be provided.

The events for which the detector may be a detector include one or more of alpha particles, beta particles, gamma rays, neutrons, X-rays, fission fragments, photons or ions. Where photons or ions are the events it is preferred that they are generated by one or more of alpha particles, beta particles, gamma rays, neutrons or fission fragments.

For alpha detection, the detector may be a surface barrier detector or Geiger counter, particularly where direct detection is desired, or an ion detector, the ion detector detecting ion events caused by the passage of alpha particles.

For beta detection, the detector may be an ion chamber or Geiger counter, particularly where direct detection is desired, or an ion detector, the ion detector detecting ion events caused by the passage of beta particles.

For gamma detection, the detector is preferably a scintillation detector or semi-conductor detector.

For neutron detection the detector is preferably a $^3$He or $BF_3$ type detector.

The detector unit may include the electrical connection for connecting the detector unit to signal handling means. The electrical connection may be a multi-core cable. The cable may be over 25 meters, over 50 meters or over 100 meters long. This can be achieved without problem to the signals through interference. It is particularly preferred that the connection does not need to employ super-screened cable and/or super-screened connections.

The monitoring system may include 10's or even hundreds of detector units. Preferably the detector units of the monitoring system are divided into groups, each group being connected to signal handling means. This is particularly preferable where the number of detector units forming the system exceeds 16 or even where it exceeds 8. Preferably a separate set of signal handling means is used for each group of detector units.

The signal handling means and/or signal handler may comprise a plurality of ports for receiving signals to be handled; means for adding an address to received signals, the address defining the port receiving the signal to which the address is added; one or more ports through which the addressed signals are outputted.

Preferably the signal handling means and/or signal handler has up to 16 input ports for receiving signals to be addressed. More preferably the signal handling means and/or signal handler has up to 8 such ports.

The signal handling means and/or signal handler preferably include one or more discriminators. Preferably, the discriminators determine which parts of the received signals correspond to genuine signals requiring further handling and/or which parts of the received signals correspond to noise and/or interference and do not require further handling. Preferably each port is connected to its own discriminator.

One or more, and preferably all, of the ports may be provided with indicators of the occurrence of received signals. The indication may be a visual indication, such as a light, and more preferably an LED which illuminates momentarily upon passage of a signal through the port.

Preferably the detector address is added to the signal to form part of the overall signal. Preferably a 3 or 4 bit detector address is added. The detector address may be added by an address encoder, preferably provided on the same card as the discriminator(s). Preferably an address for the signal handling means and/or signal handler is added to the signal to give a handler address. A 4 to 6 bit handler address for the signal handling means and/or signal handler may be used. Preferably the detector/port address and the signal handling means and/or signal handler address are added by the same encoder. Ideally a 3 bit detector/port address and 5 bit handler address are added.

An event energy address may be added to the signal, preferably to form part of the overall signal. Preferably the event energy address is representative of the energy level of the event which generated that signal. The event energy address may be added prior to combining signals from a plurality of detectors and/or ports, preferably by the signal handling means and/or signal handler. The event energy address may be added to the signals after combining signals from a plurality of detectors and/or ports.

Preferably means and/or a combiner are provided for combining the outputs of one or more of the ports and/or discriminators. Preferably the combination provides a single connection carrying all the signals received by the signal handling means and/or signal handler, most preferably all the discriminated signals.

The single connection preferably provides the input to the signal handling means output interface and/or signal handler output interface. The output interface may be an interface for a serial link, such as copper or fibre optic link, most preferably with greater than 1 gigabit/second capacity. Preferably the output interface is connected to a serial ink which conveys the output to subsequent locations and/or operations.

One or more, preferably all of the ports may be provided with -parallel outputs. The outputs may be used for monitoring the operation of the detector and/or discriminator and/or address encoding of that port. One or more parallel links may be provided for system diagnostics purposes and/or for safeguard verification and/or authentication purposes and/or for linking to other event monitoring systems or parts thereof. One or more parallel ports to receive detector type signals, generated other than by the detectors, and/or other forms of test signal may be provided.

The serial link may be an electrical connector, such as copper cable, and/or an optical connector, such as a fibre optic cable. The serial link is preferably an 16 bit link. The serial link may be at least 50 m, optionally at least 200 m, optionally at least 1000 m or more, without introducing problems of signal noise or interference. The serial link preferably links the signal handling means and/or signal handler to a subsequent stage, for instance a signal processing means and/or a signal processor.

The threshold and/or pulse shaping parameters and/or other characteristics of the discriminator(s) may be adjustable. The power and/or other characteristics of the low tension power output(s) and/or high tension power output(s) of the signal handling means may be adjustable. Preferably adjustment is possible by inputting control signals into the signal handling means and/or signal handler. The control signals may be generated and/or inputted elsewhere than the signal handling means and/or signal handler. For instance the control signals may be provided by a control location and/or signal processing means and/or a signal processor. The control signals may be provided to the discriminator and/or power supplies via the signal handling means output interface and/or signal handler output interface. The control signals may be conveyed to the signal handling means interface and/or signal handler interface by a serial link, most preferably the same serial link as provides the signal outputs from the signal handling means and/or signal handler.

The monitoring system may include a plurality of signal handling means and/or signal handlers. Preferably each signal handling means and/or signal handler is provided with its own set of detector units. The signal processing means and/or a signal processor may be equivalent to one another, most preferably only differing in the detector units to which they are connected.

Where a plurality of signal handling means and/or signal handlers are provided they may include means for adding to the signals they receive and/or output an indication of their having been handled by that particular signal handling means and/or signal handler. The indication may form part of the outputted signal. Preferably the outputs from a plurality of signal handling means and/or signal handlers are combined with one another, most preferably to form the inputs to a subsequent stage, such as signal processing means and/or a signal processor. The plurality of signal handling means and/or signal handlers may be linked to the signal processing means and/or a signal processor by a common serial link.

The signal processing means and/or a signal processor may comprise one or more ports for receiving input signals, the input signals including an indication of the origin of the signal; means for adding an indication of time to the input signals; an interface for supplying the time indication and origin indication including signals to computing means and/or a computer; computing means and/or a computer for processing the signals to produce information on the signals or events they represent, the processing of the signals being based on the time and location indications possessed by those signals.

Preferably the signals from the signal handling means and/or signal handler and/or detectors are received through a single port. The port is preferably connected to previous stages or operations by a serial link. The previous stages may include one or more signal handling means and/or signal handlers. One or more other ports may be provided, for instance for validation and/or authentication purposes and/or for system diagnostic purposes. The ports may be used to output signals altered by the signal processing means and/or a signal processor and/or signals received from preceding stages by the signal processing means and/or a signal processor. The ports may be used to input test signals to the signal processing means and/or a signal processor.

The processing means and/or a signal processor may include one or more outputs for control signals to the signal handling means and/or signal handler and/or detector units. The processing means and/or a signal processor may include one or more inputs and/or outputs for performing status checks on the signal processing means and/or a signal processor and/or detector units.

Preferably the means and/or time stamper for adding an indication of time to the input signals comprises a time stamping card. The means and/or time stamper preferably add to the signal a further signal component which indicates the time of the event. The indication of time preferably relates to the time of the detection which generated the signal in question. The time indication may be an absolute indication of time and/or an indication of the time relative to the time of other detections. The further signal or signal component may be a 24 bit address.

Preferably the signals including the time indication are provided to the interface through data buffering means and/or a data buffer. The data buffering means and/or a data buffer may store data when the data input rate from the means for adding the time indication and/or time stamper exceeds the maximum data transmission rate through the interface to the computing means and/or a computer. The stored data may be outputted to the computing means and/or a computer when the data input rate from the means for adding the time indication and/or time stamper is below the maximum data transmission rate for the interface to the computing means and/or a computer.

Preferably the interface is provided by a PCI bus.

The computing means and/or a computer is preferably directly linked to the interface. The computing means and/or a computer may alternatively be a second computing means and/or a second computer, linked to the first computing means and/or a first computer via their respective interfaces and a link between those interfaces. The interfaces may be PCI buses. The link between the interfaces may be an Ethernet link. When second computing means and/or a second computer are used to perform the computing of the signals, preferably the first computing means and/or a first computer are used for other computing purposes, for instance for system control and/or data assembly and/or data reduction and/or data presentation. Preferably the computing means and/or the computer is a computer processor. The computing means and/or the computer may be a digital signal processing card.

The information produced by the computing means and/or the computer may be an indication as to the level of event generating material in the location or locations detectable by the detecting unit or units, and/or an indication as to the distribution of event generating material in the location or locations detectable by the detecting unit or units, and/or a characteristic of the make-up of the event generating material in the location or locations detectable by the detecting unit or units, for instance isotopic composition.

The information may be produced by the computing means and/or the computer of the signal processing means and/or the signal processor.

Two or more signal processing means and/or signal processors may provide outputs which are inputted to one or more further signal processing means and/or one or more further signal processors. The further signal processing means and/or further signal processors may be provided in accordance with the signal processing means and/or the signal processor. Alternatively or additionally the further signal processing means and/or the further signal processor may provide different signal processing means and/or a different signal processor. One or more of the signal processing means and/or further signal processor and further processing means further and/or a signal processor may be linked by a common link, for instance an Ethernet link. The Ethernet link may interface with a PCI bus provided in the signal processing means and/or the signal processor and/or signal processing means further and/or further signal processor.

The signal processing means and/or the signal processor and/or further signal processing means and/or further signal processor may receive signals from one or more signal generating stages besides the signal handling means and/or signal handler described herein.

The information may be produced by the computing means and/or a computer of the further signal processing means and/or of the further signal processor.

The signal processing means and/or the signal processor may provide control signals to one or more features of previous stages and/or operations. Preferably the control signals are provided through the same serial link as provides the signal inputs to the signal processing means and/or the signal processor.

In a particularly preferred embodiment, the monitoring system comprises:

a plurality of detector units, at least one of the detector units comprising a detector for events to be monitored and an amplifier to amplify signals generated by the detector;

signal handling means and/or signal handler, the signal handling means and/or signal handler providing means to receive the amplified signals, means and/or an encoder to add to the signals an indication of the detector unit from which the signals originated and means to combine the signals;

a serial link for conveying the combined signals from the signal handling stage and/or signal handler to signal processing means and/or a signal processor; and signal processing means and/or a signal processor, the signal processing means and/or a signal processor including means for receiving the signals and/or signal receiver including the indication of detector unit of origin of the signal, means and/or a time stamper for applying an indication of time of the generating of the signal by the detector unit to the signal, and computing means and/or a computer for processing the signals using software to produce information on the signals or events they represent, the processing of the signals being based on the time and detector unit indications possessed by those signals.

According to a third aspect of the invention, we provide a method of monitoring events, the method comprising providing a plurality of detector units in detecting range of the events, each detector unit generating an output signal in response to an event detected by that detector unit;

feeding the signal outputs of the detector units as signal inputs to signal handling means and/or signal handler, the signal handling means and/or signal handler generating signal outputs; and feeding the signal outputs of the signal handling means and/or signal handler as signal inputs to signal processing means and/or a signal processor, the signal processing means and/or the signal processor processing the signals and generating an output indicative of a characteristic of the events being monitored;

wherein the signal handling means and/or signal handler add to the signal outputs of the detectors a signal component indicative of the detector, the combined signal forming the signal handling means output and/or the signal handler signal output.

The third aspect of the invention may include features, options and possibilities set out elsewhere in this document, including steps, stages, methods and operations necessary for their implementation.

According to a fourth aspect of the invention we provide a detector unit, the detector unit comprising an event detector, the event detector being capable of generating an electrical output in response to an event, the detector unit further comprising a signal amplifier capable of amplifying the detector output, the amplified output forming the detector unit output.

Preferably the event is an emission type associated with radiation.

The detector unit output may be an analogue signal.

Preferably the signal amplifier is provided in close proximity with the detector to give the detector unit. Close proximity may be with a link, such as an electrical conductor link, between the two, the link length being less than 1 meter, preferably less than 50 cm and ideally less than 15 cm, particularly where the link is not to be super-screened. Link lengths of 15 m or less may be used where super-screened links are employed. It is particularly preferred that the amplifier is mounted on the detector to give the detector unit. The mounting may be effected by a threaded portion on the detector and corresponding threaded portion on the amplifier.

Preferably each detector is provided with its own amplifier.

Preferably the amplifier has one or more, most preferably all of, a connector for signal output, a connector for receiving signal input from the detector, a connector for receiving low tension power input, a connection for receiving high tension power input. In one embodiment the signal input is provided on one end of the amplifier, with the signal output, low tension input and high tension input provided on the opposing end of the amplifier.

The amplifier may be connected to other components in a monitoring system for the events via an electrical connector. Preferably the connector is attached to the amplifier through a screw thread connection, the screw thread on the amplifier corresponding to the screw thread on the electrical connection. Preferably a signal electrical connector is provided, most preferably with means for conveying the signal output, low tension power input and high tension power input. The electrical connector may be a multi-core cable.

One or more, preferably all, of the detector units may be provided with signal branching capability and/or parallel outputs and/or inputs. The outputs may be used for monitoring the operation of the detector unit. One or more parallel links may be provided for system diagnostics purposes and/or safeguard verification and/or authentication purposes and/or for linking to other event monitoring systems or parts thereof. One or more parallel inputs to receive detector type signals, generated other than by the detectors, and/or other forms of test signal may be provided.

The events for which the detector may be a detector include one or more of alpha particles, beta particles, gamma rays, X-rays, fission fragments, neutrons, photons or ions.

For alpha detection, the detector may be a surface barrier detector or Geiger detector, particularly where direct detection is desired, or an ion detector, the ion detector detecting ion events caused by the passage of alpha particles.

For beta detection, the detector may be an ion chamber or Geiger counter, particularly where direct detection is desired, or an ion detector, the ion detector detecting ion events caused by the passage of beta particles.

For gamma detection, the detector may be a scintillation type detector or semi-conductor type detector.

For neutron detection the detector is preferably a $^3$He or $BF_3$ type detector.

The detector unit may include the electrical connection for connecting the detector unit to signal handling means. The electrical connection may be a multi-core cable. The cable may be over 25 meters, over 50 meters or over 100 meters long. This can be achieved without problem to the signals through interference. It is particularly preferred that the connection does not employ super-screened cable and/or super-screened connections.

The signal handling means and/or signal handler may be provided according to the fourth aspect of the invention and/or as detailed elsewhere in this document.

According to a fifth aspect of the invention we provide a signal handling means and/or signal handler, the signal handling means and/or signal handler comprising:

- a plurality of ports for receiving signals to be handled;
- means and/or an encoder for adding an address to received signals, the address defining the port receiving the signal to which the address is added;
- one or more ports through which the addressed signals are outputted.

Preferably the signal handling means and/or signal handler has up to 16 input ports for receiving signals to be addressed. More preferably the signal handling means and/or signal handler has up to 8 such ports.

The signal handling means and/or signal handler preferably include one or more discriminators. Preferably, the discriminators determine which parts of the received signals correspond to genuine signals requiring further handling and/or which parts of the received signals correspond to noise and/or interference and do not require further handling. Preferably each port is connected to its own discriminator.

One or more, and preferably all, of the ports may be provided with indicators of the occurrence of received signals. The indication may be a visual indication, such as a light, and more preferably an LED which illuminates momentarily upon passage of a signal through the port.

Preferably the address is added to the signal to form part of the overall signal. Preferably a 3 or 4 bit address is added. The address may be added by an address encoder, preferably provided on the same card as the discriminator(s). Preferably an address for the signal handling means and/or signal handler is added to the signal. A 4 to 6 bit address for the signal handling means may be used. Preferably the detector/port address and the signal handling means address are added by the same encoder. Ideally a 3 bit detector/port address and a 5 bit signal handling means address are added.

Preferably means are provided for combining the outputs of one or more of the ports and/or discriminators. Preferably the combination provides a single connection carrying all the signals received by the signal handling means and/or signal handler, most preferably all the discriminated signals.

The single connection preferably provides the input to the signal handling means output interface. The output interface may be an interface for a serial link, such as copper or fibre optic link, most preferably with greater than 1 gigabit/second capacity. Preferably the output interface is connected to a serial link which conveys the, output to subsequent locations and/or operations.

One or more, preferably all of the ports may be provided with parallel outputs. The outputs may be used for monitoring the operation of the detector and/or discriminator and/or address encoding of that port. One or more parallel links may be provided for system diagnostics purposes and/or for safeguard verification and/or authentication purposes and/or for linking to other event monitoring systems or parts thereof. One or more parallel ports to receive detector type signals, generated other than by the detectors, and/or other forms of test signal may be provided.

The serial link may be an electrical connector, such as copper cable, and/or an optical connector, such as a fibre optic cable. The serial link is preferably an 8 bit link. The serial link may be at least 50 m, optionally at least 200 m, optionally at least 1000 m or more, without introducing problems of signal noise or interference. The serial link preferably links the signal handling means and/or signal handler to a subsequent stage, for instance a signal processing means and/or a signal processor.

The threshold and/or other characteristics of the discriminator(s) may be adjustable. The power and/or other characteristics of the low tension power output(s) and/or high tension power output(s) of the signal handling means and/or signal handler may be adjustable. Preferably adjustment is possible by inputting control signals into the signal handling means. The control signals may be generated and/or inputted elsewhere than the signal handling means and/or signal handler. For instance the control signals may be provided by a control location and/or signal processing means and/or a signal processor. The control signals may be provided to the discriminator and/or power supplies via the signal handling means output interface and/or signal handler output interface. The control signals may be conveyed to the signal handling means interface and/or signal handler interface by a serial link, most preferably the same serial link as provides the signal outputs from the signal handling means and/or signal handler.

According to a sixth aspect of the invention we provide signal processing means and/or a signal processor, the signal processing means and/or a signal processor comprising:

- one or more ports for receiving input signals, the input signals including an indication of the origin of the signal;
- means and/or a time stamper for adding an indication of time to the input signals;
- an interface for supplying the time indication and origin indication including signals to computing means and/or a computer;
- computing means and/or a computer for processing the signals to produce information on the signals or events they represent, the processing of the signals being based on the time and location indications possessed by those signals.

Preferably the signals from the signal handling means and/or signal handler and/or detector units are received through a single port. The port is preferably connected to previous stages or operations by a serial link. The previous stages may include one or more signal handling means and/or signal handler. One or more other ports may be provided, for instance for validation and/or authentication purposes and/or for system diagnostic purposes. The ports may be used to output signals altered by the signal processing means and/or a signal processor and/or signals received from preceding stages by the signal processing means and/or a signal processor. The ports may be used to input test signals to the signal processing means and/or a signal processor.

Preferably the means and/or time stamper for adding an indication of time to the input signals comprises a time stamping card. The indication of time preferably relates to the time of the detection which generated the signal in question. The indication of time may be related to the time at which the signal reaches the means for adding an indication of time. The time indication may be an absolute indication of time and/or an indication of the time relative to the time of other detections.

Preferably the signals including the time indication are provided to the interface through data buffering means and/or data buffer. The data buffering means and/or data buffer may store data when the data input rate from the means and/or time stamper for adding the time indication exceeds the maximum data transmission rate through the interface to the computing means and/or a computer. The stored data may be outputted to the computing means and/or a computer when the data input rate from the means and/or time stamper for adding the time indication is below the maximum data transmission rate for the interface to the computing means and/or a computer.

Preferably the interface is provided by a PCI bus.

Preferably the computing means and/or a computer is a computer processor. The computing means and/or a computer may be a digital signal processing card.

The signal processing means and/or a signal processor may provide control signals to one or more features of previous stages and/or operations. Preferably the control signals are provided through the same serial link as provides the signal inputs to the signal processing means and/or a signal processor.

These and other aims, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1A:
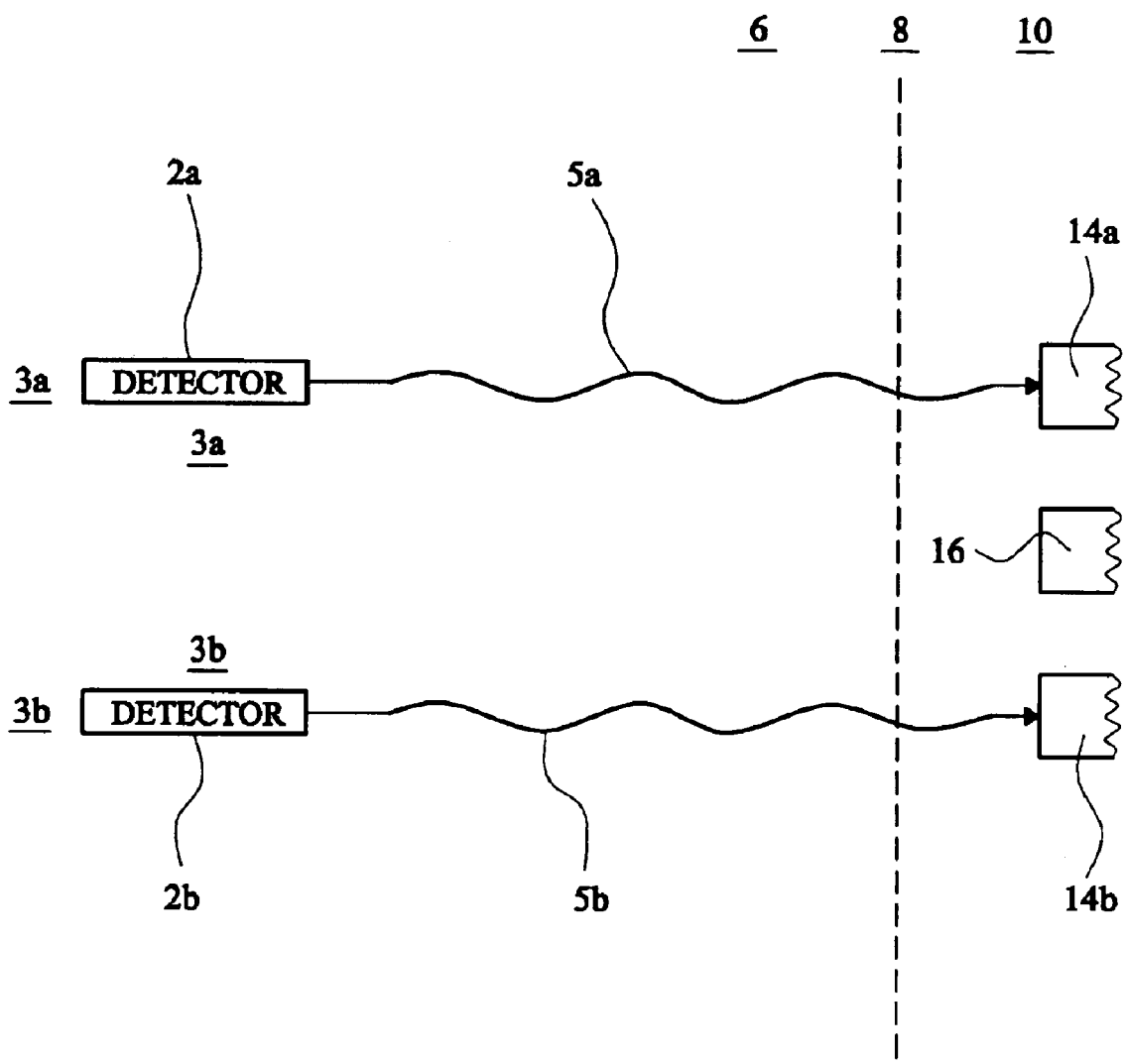
FIG. 1 illustrates a prior art radioactivity monitoring system, with particular applicability to monitoring neutron emissions.

In a great variety of situations, particularly with regard to monitoring radiation and associated characteristics, it is necessary to obtain raw signals indicative of the characteristic being monitored, convey those signals to a location away from the point of monitoring, handle the signals in manner which maintains or improves the raw signals and process those signals to obtain the basic characteristics and/or process those signals to obtain information based upon sophisticated analysis of the raw signals.

A wide variety of situations and scenarios call for radiation monitoring. Applications include the following:

1. Safeguard and process monitoring situations where information is needed for accountancy and control purposes. Such systems include: real time measurement of the plutonium content of individual vessels, process zones or plant through processing the signals arising from a significant number of neutron detectors; and determination of fissile material contents of cans, drums or small packages through active neutron interrogation of samples.

2. Decommissioning applications where the distribution of radioactive material in an item, area or location needs to be determined, for instance, determining the plutonium content of a glove box or the like through detection of neutrons emitted by fissile material in the glove box.

3. Criticality monitoring where a rapid indication of criticality event is needed and substantial post-event information about the criticality is desirable, this information being obtained through an array of detectors distributed throughout the location for which criticality occurrence is a possibility.

4. Storage and maintenance where monitoring large areas for changes in behavior over time is required, for instance through arrays of gamma detectors or through detecting by-products of radioactive emissions, such as photons.

5. Waste monitoring, where the emission levels of items and/or the contents of containers must be determined, using passive neutron, active neutron or other techniques.

6. Health physics and environmental monitoring, where radiation arising from areas, for instance gamma in air levels, must be determined.

A substantial number of different environments can also require monitoring and impose different requirements on the instrument as a result. For instance, instruments are used to monitor internal characteristics of relatively small containers, surface contamination of large items, long term monitoring of large areas, monitoring substantial numbers of individual locations within an overall plant in a separate manner and a substantial number of other cases.

The overall result of the myriad different environments, different purposes and different forms of emissions which are monitored is that quite different techniques and very different instruments have been developed to answer each of these specific purposes. Proceeding in this way has led to instruments which are carefully tailored to their end use and give high quality information as a result.

Due to the working environment of radiation monitoring instruments there is a well established and strong drive to simplify and minimize the cost of those components which are presented in close proximity to the radiation and provide the more sophisticated and expensive components of the system at as great separation as necessary and practicable from the radiation. In this way, the sophisticated components are protected from the radiation and provided in locations for which maintenance and replacement does not require access to active areas.

Figure 1B:
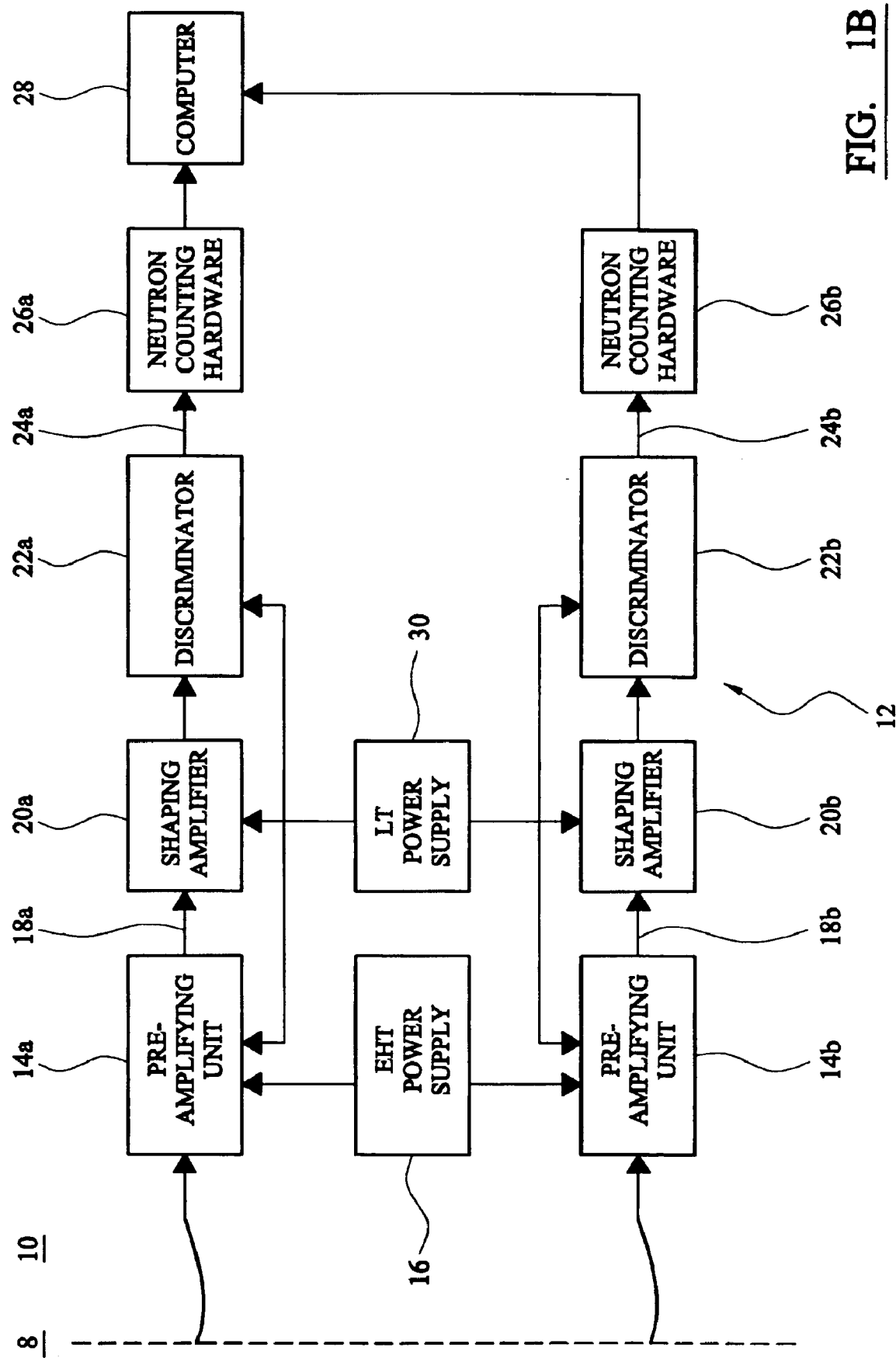

A system indicative of these two trends is illustrated in FIG. 1 in relation to an instrument which monitors plutonium distribution in process vessels.

The system employs individual detectors 2a, 2b, etc, or groups of detectors in close proximity with the locations 3a, 3b, etc, to be monitored. Neutrons present in the locations 3a, 3b are detected by the respective detectors 2a, 2b and generate small electrical signals which are conveyed along cables 5a, 5b respectively, to the signal handling and processing system. The cables 5 are frequently of considerable length and remove the signal information from the active area 6 through a boundary 8, provided by distance or physical separation, such as a wall, to non-active area 10. This area 10 contains the apparatus for dealing with the signals, generally designated 12.

In use, neutrons in location 3a generate a signal upon detection by detector 2a and the signals are conveyed along cable 5a. The cable 5a leads to an initial preamplifying unit 14a. Once amplified, the signals pass on through connection 18a to shaping amplifier 20a. The shaping amplifier assists in processing the signals prior to their being fed to discriminator 22a. The discriminator 22a identifies signals corresponding to events at the detector 2a as distinct from noise and other apparent signals which do not cross the determined threshold. The cleaned signals are then passed on through connection 24a to the neutron counting hardware 26a.

The neutron counting hardware 26a includes a straight counts of the total neutrons detected, TNC, and neutron coincidence counting, NCC, (determining neutrons which arrive within sufficiently close proximity to one another to constitute neutrons arising from the same fission event).

The results from the counting hardware 26a are fed to computer 28 for further consideration and presentation.

Signals from the other location 3b are handled in an identical manner, but by separate units. A great number of other detectors may form part of the overall instrument/system with each being handled in an identical way, by separate units.

Results from the other counting stages 26b etc, are also fed to the computer 28 for common consideration, comparison or the like.

Where possible the pre-amplifiers 14a, 14b are powered by a common EHT power supply 16 and the discriminators 22a, 22b, shaping amplifiers 20a, 20b and preamplifier 14a, 14b are powered by a common LT power supply 30.

The more complex hardware which performs these various steps are sufficiently separated from the active locations 3a, 3b, etc., in plant area 6 for protection, easy access for maintenance and replacement.

Additionally, the arrangement and functionality of the hardware is designed and tailored to handle the signals it receives with a specific view to generating through its hardware the desired information.

The present invention represents a radical deviation from current trends in the industry in providing a system intended to handle and process signals encountered in a variety of different instrument types using consistent equipment capable of easy modification, where required for alternative purposes. The system also represents a deviation from present trends in providing additional components than the detectors in proximity with the detectors. Significant technical and economic advantages stem from these general changes, together with advantages from more specific features of the invention.

In general the system provides detectors at location as required for the monitoring task. Each of the detectors is provided with an attached amplifier for its signals. The amplifiers are small and of low cost, but are sufficient to give immediate amplification of the signals and so avoid complicated hardware to protect against interference. An intermediate stage applies some initial handling of the signals to attach a detector address to the signal and, where necessary due to a number of equivalent handling stages being used, attach a handling stage address. The handling stage or stages may also attach an energy level address to the signals to indicate the energy of the event detected. This allows all the signals to be combined into a single link, a serial link, without loss of information. The serial link reduces cabling requirements by avoiding the need for parallel links. The first part of the subsequent processing stage adds time of event information to the signals, using time stamping, which facilitates computer software based processing. The processing itself can then be carried out readily and in a number of ways using the software and the detailed information possessed on the events.

The design of the system to operate in this way renders it potentially applicable to the provision of a number of specific instruments through the use of the same under lying generic system. This has significant cost saving benefits. These benefits are achieved without prejudicing the generic systems applicability to simple instrument cases on cost grounds and without prejudicing the generic systems applicability to complex instrument cases on technical capability grounds.

To achieve the advantages of the new overall system a number of individual parts of the system have been designed and optimized, resulting in still further benefits. The parts of the system are described below as used in combination with one another, but is should be appreciated that significant benefits arise from using them individually, without the other parts.

Figure 2:
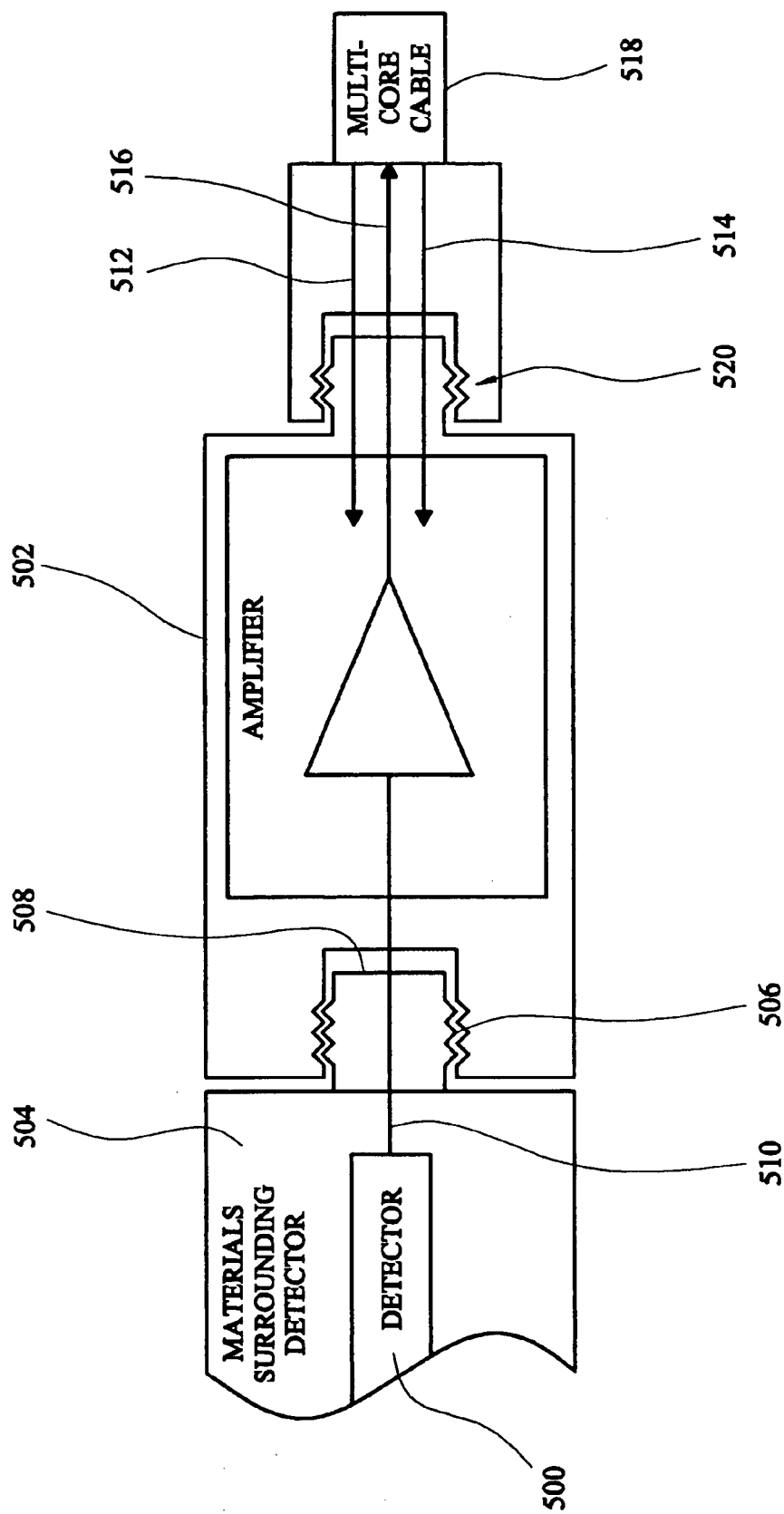
FIG. 2 illustrates a portion of a detector according to an embodiment of the present invention.

A revised detector structure for use in the present invention is illustrated in FIG. 2. The detector structure provided in close proximity to the environment to be monitored features the detector 500 itself and an amplifier 502 mounted on one end of the detector 500. The introduction of additional apparatus into contact with or proximity to the hostile environment represents a significant improvement relative to prior art practice.

The detector 500 is of a type appropriate to generate signals in response to detection of the emission form or by-product under consideration.

In the present example the detector 500 is a neutron detector, and more specifically a $^3$He proportional detector. The detector 500 and the materials 504 surrounding it can be varied to give detection of neutrons of the desired energy, dependant on the application of the instrument.

The detector 500 is provided with a male screw thread 506 which co-operates with a corresponding female thread 508 on the amplifier 502. The amplifier receives the detector signals along connection 510, high tension power supply through connection 512 and low tension power supply through connection 514. The very low level signals arising in the detector 500 are significantly amplified in the amplifier 502 and outputted to subsequent stages using connection 516. The output connection 516 and power supplies 512, 514 are provided in a single multi-core cable 518 which is connected to the amplifier 502 through screw fitting 520.

The amplification provided by the amplifier 502 on the detector 500 has been found to have significant advantages in reducing problems with noise and interference which arise in the connections linking the detectors 500 to the rest of the system. In addition it has been found that amplification of the signal soon after it arises in this way does away with the need for super-screened cables to connect the detectors to the subsequent and distant sophisticated amplification stage of the prior art. This represents a significant cost saving in terms of the super-screened cable and connectors which are no longer required and also simplifies the installation and maintenance of the system.

Figure 3:
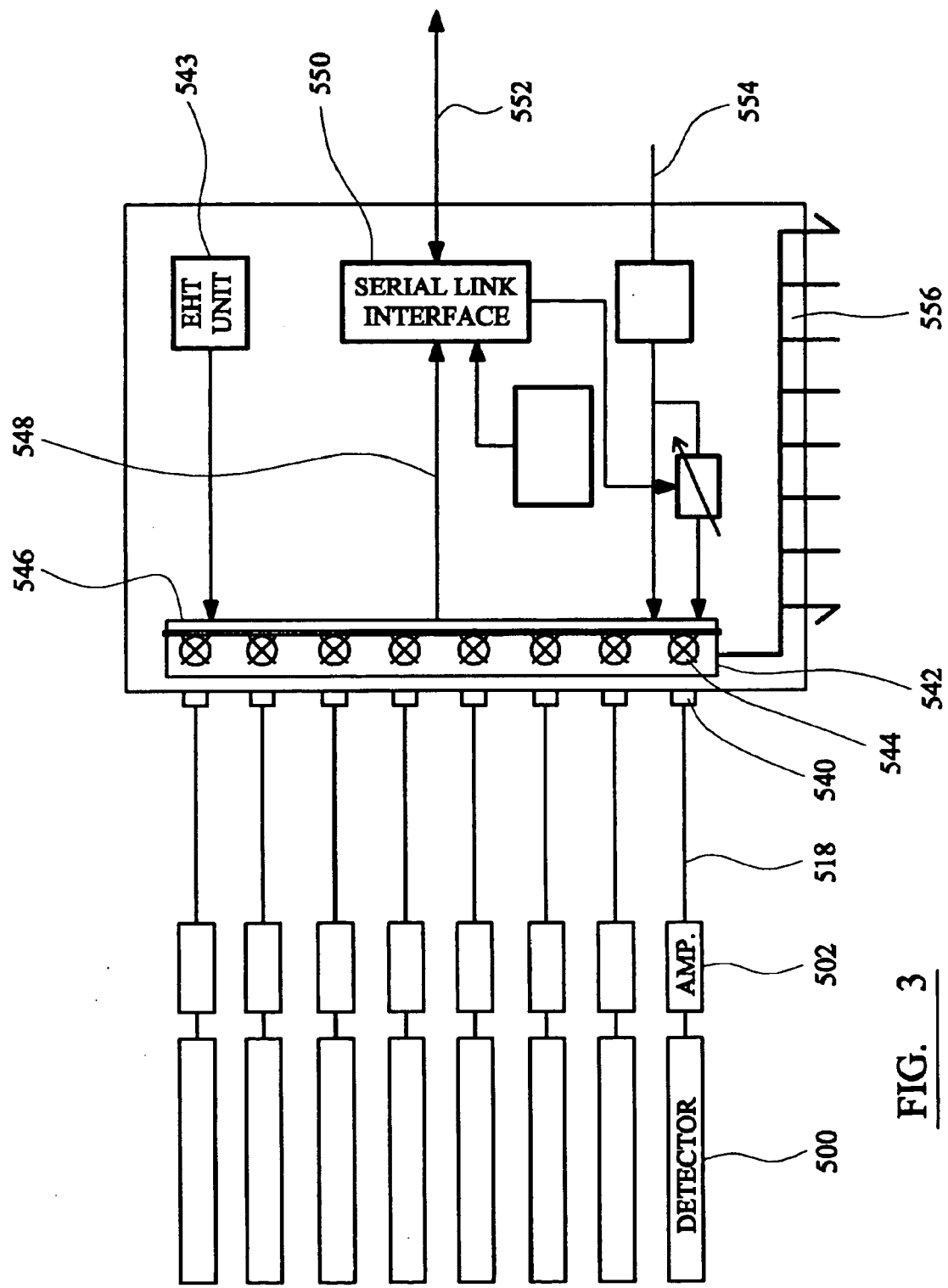
FIG. 3 illustrates a signal handling system according to an embodiment of the invention.

A signal handling system which facilitates the general changes to the monitoring system described above is illustrated in FIG. 3.

The so-called "hub" unit is connected via the multi-core cable 518 to a detector 500 as described above through ports 540. Eight detectors 500, corresponding amplifiers 502, cables 518 and ports 540 are illustrated, but any number could be provided, with a preference for 16 or less, such as the eight set-up shown.

Each of the ports 540, corresponding to a signal channel, is provided with a discriminator 542 and an optical indicator 544 of neutron generated signals in that channel. The discriminators 542 convert the analogue signal received into a digital output. The component which carries the discriminators 542 also carries an address encoder 546. The address encoder adds a 3 or 4 bit detector address on to a signal received from a detector 500.

A single input connection 548, which combines all of the detector signals, is then fed to the serial link interface 550. The serial link interface 550 enables a number of functions to be controlled by input signals from distant locations, as described below. In addition, before conveying the signals onto subsequent stages the serial link interface 550 adds a 4 or 5 bit hub address to the signal and detector address. Via the serial link 552 the serial link interface 550 and hence its hub, is daisy chained to other hubs so allowing all the signals of all the systems detectors to be processed together in subsequent stages. The serial link 552 carries all the signal and address information for the detectors of that hub and of other hubs to subsequent stages.

An event energy address may be added to each signal by a common unit after the signals are combined or by separate units for each channel prior to combination. In either way this address provides a representation of the event's energy to go with the location address and time information.

Power is supplied to the hub via mains connection 554. HT and LT power are provided to each of the detectors 500 via auto ramping EHT unit 543, which is under the control of the serial link interface 550.

The serial link interface 550 is also able to adjust the threshold values for the discriminators 542.

To facilitate monitoring of the signal channels parallel outputs 556 are provided. These outputs also allow the system to be connected to existing counting electronics if desired and/or allow for the provision of diagnostic or verification signals.

The entire hub unit is electromagnetically compatibility (EMC) shielded to reduce interference and noise. The hub is generally mounted in an accessible area of the plant, but this can be a significant distance from the detector locations without problem and similarly a significant distance from subsequent stages of the system.

The serial link, generally 16 bit, can accommodate a very high data rate. For instance, serial links offering to deliver 1 gigabit/sec or more, (a maximum of 100 Mbytes/sec) are available. As the systems are point to point systems they are additionally not burdened with the overheads of a networking protocol.

Organizing the signal handling in this way means that all of the power supplied to the system are integrated into the hub units so removing interconnections. Additionally the serial link allows a large reduction in the number of cables used to connect the system to subsequent stages down to one.

Figure 4:
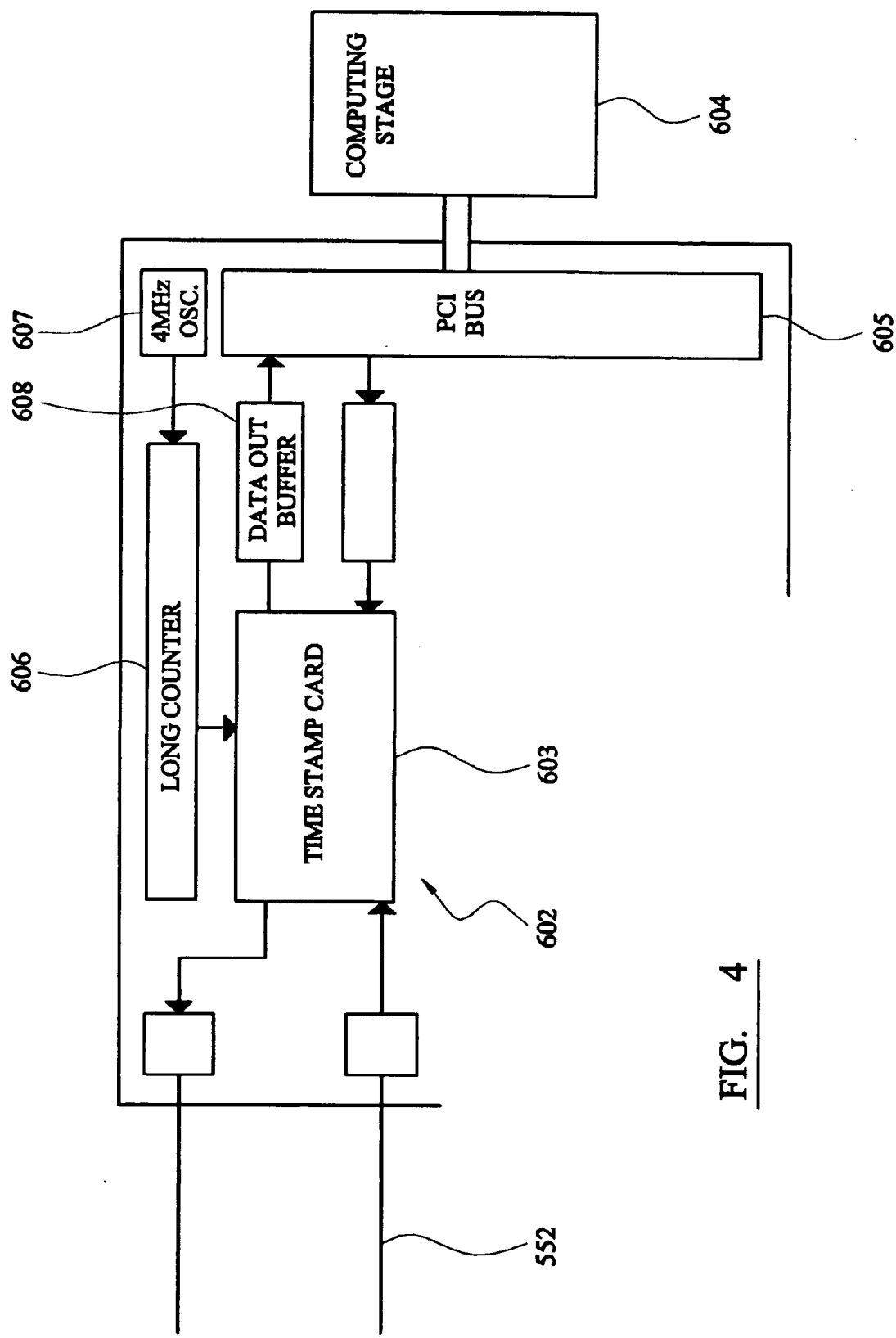
FIG. 4 illustrates a signal processing system according to an embodiment of the present invention.

A signal processing system which facilitates the general changes to the monitoring system described above is illustrated in FIG. 4. This consists of a time stamper stage 602 and the actual computing stage 604, the two being linked via a PCI bus 605.

The time stamper 602 receives signal, detector address and hub address inputs via the serial link 552. These enter the time stamp card 603 and are allocated an appropriate event time, a 24 bit number, under the control of the long counter 606 which is driven by a 4 MHz oscillator 607. The signal, detector address, hub address and time information then passes to data out buffer 608 before feeding to the PCI bus 605 and on to the computing stage 604. Time stamping can be provided by a relatively small unit, fitting as a card into a PC or laptop computer, for instance or as a stand alone unit.

Figure 5:
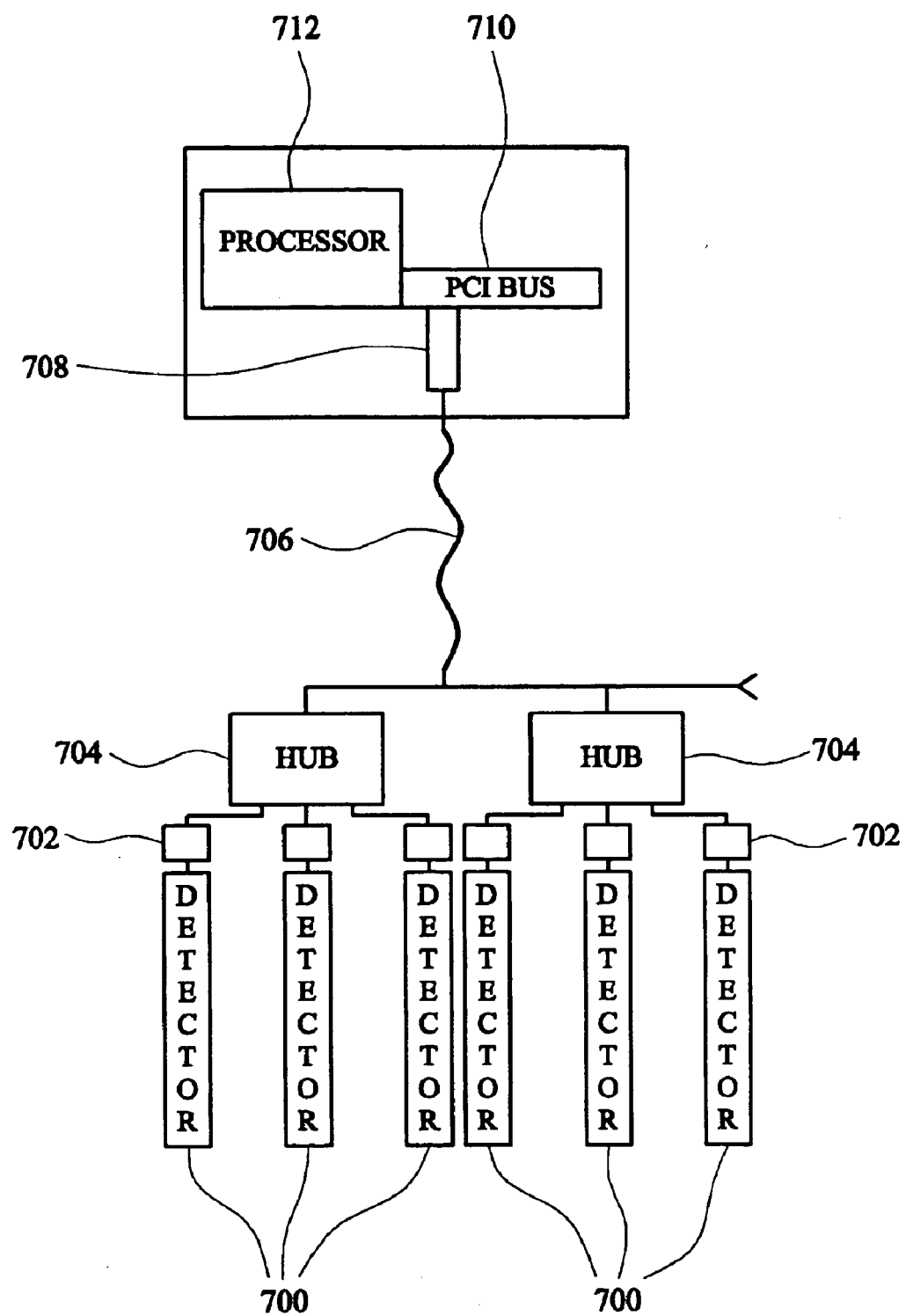
FIG. 5 illustrates one embodiment of a monitoring system according to the present invention.

The operation of the computing stage 604 depends on the complexity of the system. FIG. 5 illustrates a relatively simple system requiring only a low number of detectors to be operated. In this case, the signals are generated at the detectors 700, amplified by the attached amplifiers 702 and fed to hub 704. The hub 704 attaches the detector address details and combines all of the signals to feed them via serial link 706 to time stamping card 708. The data is fed from the time stamping card 708 through PCI bus 710 to a processor 712, such as a Pentium processor which conducts the counting process in real time. As an alternative the PCI bus 710 can be connected to a Digital Signal Processing plug-in card.

Figure 6:
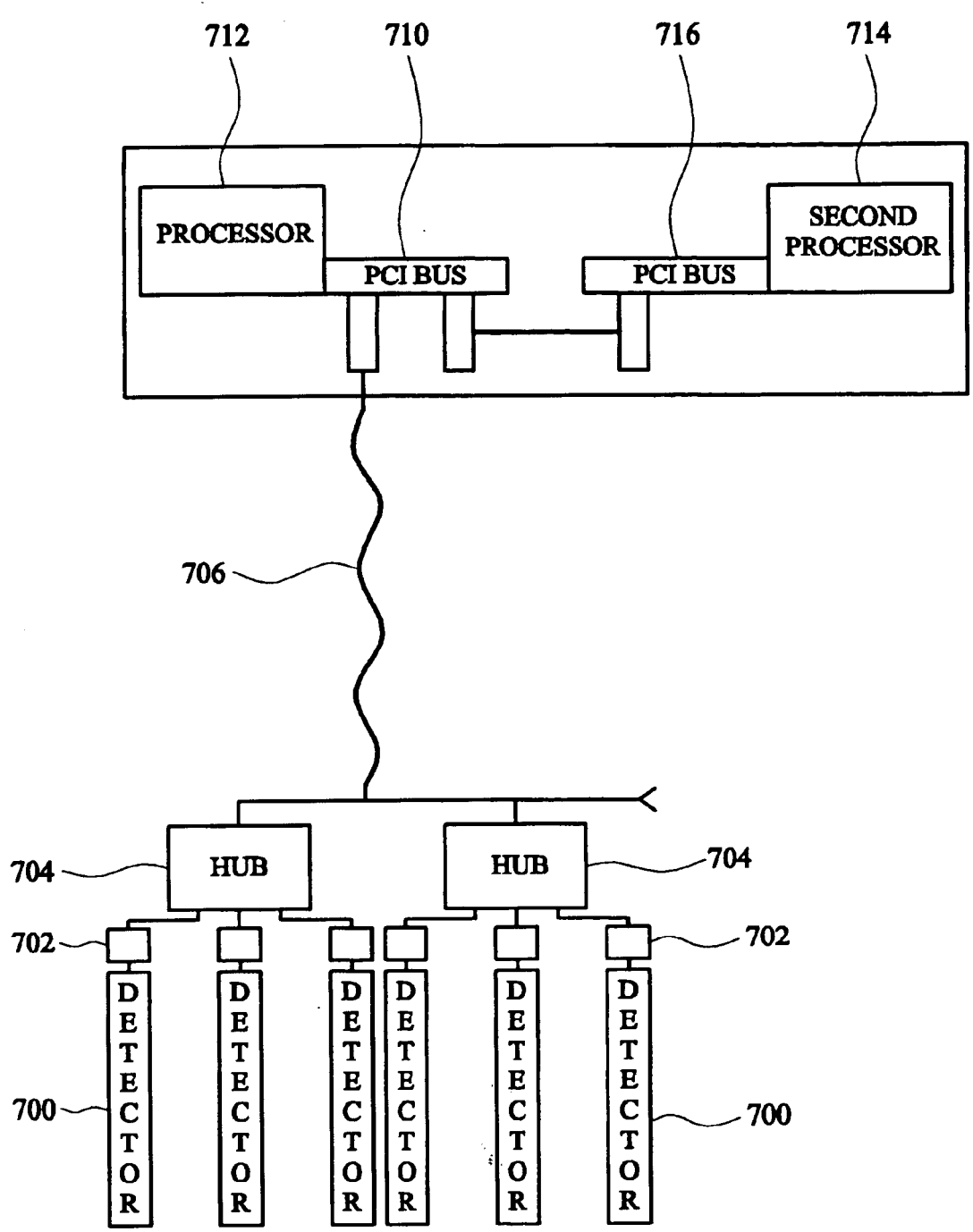
FIG. 6 illustrates a second embodiment of a monitoring system according to the present invention.

The counting process is effected by an algorithm, which even when programmed in C++, has sufficient throughput to provide neutron coincidence counting. Other neutron counting operations, such as time gated scaling (TGS), or total neutron counting (TNC), or multiplicity, or imaging techniques generally require less throughput capacity.

Where greater numbers of detector need to be handled, or the system needs to perform other functions at the same time as the neutron counting, the processing capability is increased by providing a second processor 714, such as a Pentium processor, on the same chassis and linked through their respective PCI buses 710, 716 via an Ethernet link. In general, the second processor 714 would then be used to perform the counting algorithm with the first processor 712 performing the other functions. Such an embodiment is illustrated in FIG. 6 and clearly indicates how the system allows increased capability to be built on to the system of FIG. 5, described above, in a fully compatible manner using easily effected interfaces and low cost hardware. Such processing is possible using a laptop computer as the first processor with the second processor being provided by a similar sized unit. This clearly illustrates the compact nature of the systems processing side, an important consideration in relation to temporary or portable deployment.

Figure 7A:
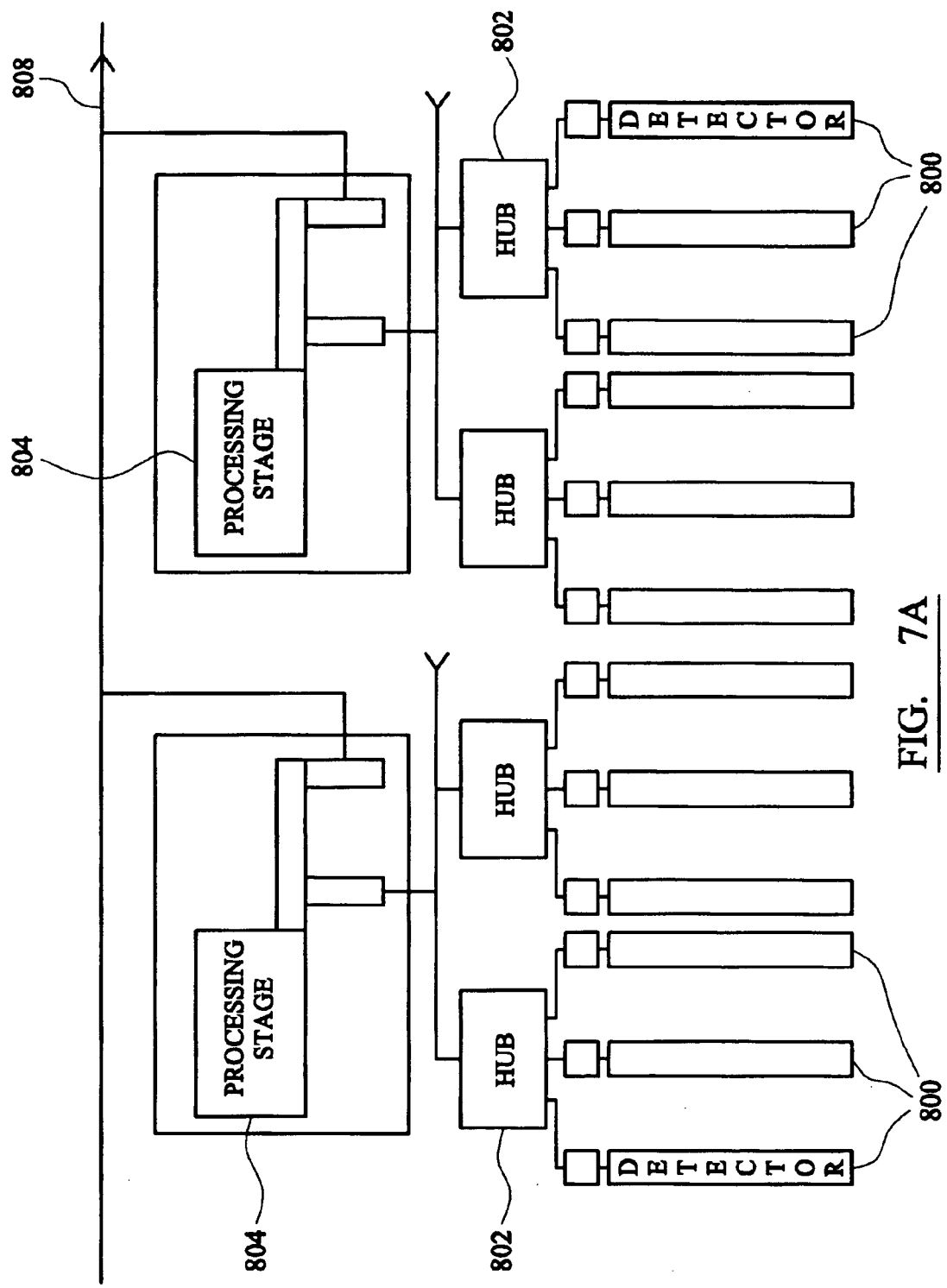
FIG. 7 illustrates a third embodiment of a monitoring system according to the present invention.
Figure 7B:
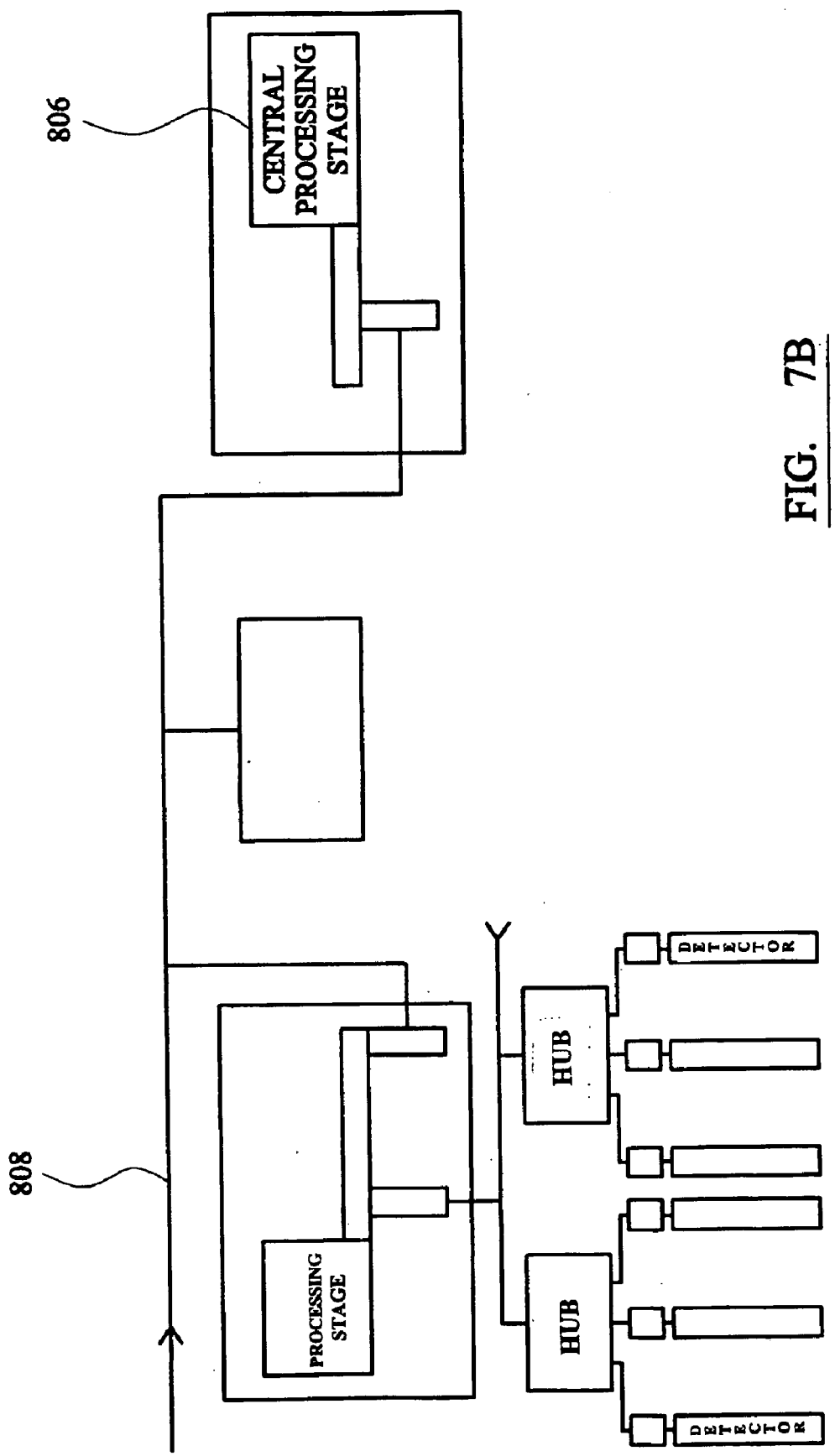

For particularly large systems, for instance monitoring a great number of locations in a process plant, and/or for more complex systems, for instance where a number of different detector types or detector deployments where used, a still more capable system based around the same generic system can be used. As illustrated in FIG. 7 the system now provides a series of sets of detectors 800 which feed to hubs 802 and then to processing stages 804. The processors in these stages 804 perform the real time neutron counting algorithms. The expansion of the systems capability comes from linking the results from these stages 804 to central processing stage 806 via an Ethernet link 808. The central processing stage 806 can perform collation, storage, display and other functions, taking into account the type of information provided by the locationally different, and potentially different in other ways detectors 800 of the various hubs 802. Optionally the system may be provided with means to synchronize the times allocated by the time stamper cards of the various processing means.

In general, for all the systems, the detector to hub connections can be long, 100 m+ and the hub to processing stage connections (copper wire and/or fibre optic) can be very long, 1 km+, without technical difficulties.

The parts of the system offer significant benefits in their own right, with or without each other, as well as contributing to the success of the overall monitoring system changes.

In additional to reducing the cost of the unit and cost of designing further units by going against the trend of specialized units for distinct situations, the monitoring system now proposed also presents significant other advantages when taken as a whole or in relation to individual parts thereof. These advantages include:
  i) avoiding the need for super-screened cables and connectors between detectors and pre-amplifier;
  ii) reduced interference arising in the signal due to amplifier design and overall system design;
  iii) reduced impact of interference due to early amplification of signals;
  iv) avoids the use of long cable lengths with consequential signal deterioration and loss;
  v) avoids the need for separate hardware to process separate signal channels, so reducing cost;
  vi) reduces the number of cables which must be laid between the general area containing the detectors and the signal processing area;
  vii) power supplies for the system are fully integrated so avoiding the need for an array of interconnectors;
  viii) the provision of easily revised counting or other functions through software changes without requiring hardware changes;
  ix) the system requires less space;
  x) the system is lighter in weight and more portable;
  xi) the system can be used to replace existing systems and/or to supplement existing systems, in-situ, with minimal modification of the existing system components;
  xii) the system is suitable for operation by a lap-top or portable computing unit;
  xiii) the discriminator thresholds can be set and varied by the computer;
  xiv) a count indication, close to the detectors is provide for diagnostic purposes;
  xv) the system is more modular in terms of its components to allow easy up grading as individual components improve;
  xvi) improved technical specification in terms of channels available, parameter variability and control, reduced dead time, improved ease of remote operation, accommodation of high count rates;
  xvii) the ability to branch signals at detector unit and/or signal handling means and/or signal processing means stages for verification, diagnostic or other purposes;
  xviii) the ability to easily link the system to existing counting systems;
  xix) the ability to perform system status checks readily;
  xx) the ability to perform system health checks easily and thoroughly;
  xxi) the application of consistent power levels and other conditions to all parts through the use of integrated powers supplies;
  xxii) the ability to retrieve and reanalyize the data collected at a later date;
  xxiii) the ability to apply different variables and criteria to the same data, using software, to determine the effect thereof.

At the same time the invention still provides a system which:
  i) separates complex, costly or service requiring components from the hostile environment;
  ii) the components of the system, including those needing to be deployed in hostile environments, are easy to deploy.

As well as being suited for use in neutron counting systems, such as those used for inventory control, on which the emphasis was placed in the description above, the present invention is also suited for use in other counting or event monitoring situations. The following represent some examples of such possibilities, but in no way is exhaustive.

Criticality Monitoring Instruments

These instruments, such as the CIDAS™ (Critically Incident Detection and Alarm system) system offered by the applicant are intended to give visual and audible warning of criticality events should they occur. This is achieved by an array of gamma detectors which are positioned throughout the area where criticality could occur. The detectors are wired back to an alarm triggering system and other processing functions at a central location. An important feature of such systems is the information which they can provide after an event has occurred, to determine the nature of the event, areas effected and other information. A system according to the present invention is ideally suited to achieving this as it allows large arrays of detectors to be operated successfully with detector specific and time specific information being obtained at very high rates and stored for future use.

Large Area Monitoring Instruments

Long term storage, plant moth balling and other applications call for monitoring of large areas for changing emission levels and/or patterns. Such systems use general area monitors which feed their information to central locations for processing. A wide variety of detector units can be used in such cases, including scintillators. Once again the present invention is ideally suited to such systems in providing data collection and processing, even where the detection is of emission by-products, rather than the emission itself.

Single Location Investigating Instruments

Certain instruments are intended to monitor relatively small locations, potentially with the intention to obtain very detailed information. One such instrument is the applicant's DISPIM™ (Decommissioning In-Situ Plutonium Invention Monitor) monitoring instrument. This uses a significant number of neutron detectors which are placed in close proximity with the location under investigation, such as a glove box. Neutron counts and multiplicity counts are taken and the results processed to obtain information about the level and distribution of neutron sources within the location. The simple forms of the invention described above are suited to this data collection and processing requirement, with the potential to link a number of such instruments together using the more complex system structures described above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An event monitoring system, the events being neutrons, the event monitoring system comprising:
  a plurality of detector units, at least one of the detector units comprising a detector for the events to be monitored and an amplifier to amplify signals generated by the detector;

a signal handler, the signal handler receiving the amplified signals from the detectors, an adder to add to the signals an indication of the detector unit from which the signals originated and a combiner to combine the signals after the addition of the indication;

a serial link for conveying the combined signals from the signal handler to a signal processor; and a signal processor, the signal processor including a signal receiver for the combined signals which include the indication of the detector unit, a time stamper for applying to the signal an indication of time of the generation of the signal by the detector unit, and a computer for processing the signals using software to produce information on the signals or events they represent, the processing of the signals using the time and detector unit indications possessed by those signals.

2. A system according to claim 1 in which the signal amplifier is mounted on the detector.

3. A system according to claim 1 in which a neutron energy indication is added to the signals from the detectors.

4. A system according to claim 3 in which the neutron energy indication is added by the signal handler.

5. A system according to claim 3 in which the neutron energy indication is added prior to combining the signals to form the combined signals.

6. An event monitoring system in which the events arise as a result of an emission by a radioactive material, the event monitoring system comprising:

a plurality of detector units for the events, each detector unit generating an output signal in response to an event detected by that detector;

a signal handler which receives as signal inputs, the signal outputs of the detector units and generates signal handler signal outputs; and a signal processor which receives as signal inputs the signal outputs of the signal handler, the signal processor processing the signals and generating an output indicative of the characteristic of the events being monitored;

wherein the signal handler includes an indication adder to add to the signal outputs of the detector units an indication of the detector unit from which the signal output originated, the combined signal forming the signal handler signal output.

7. A system according to claim 6 in which the signal handler comprises: a plurality of ports for receiving signals to be handled; an indication adder for adding an address to received signals, the address defining the port receiving the signal to which the address is added; and one or more ports through which the addressed signals are outputted.

8. A system according to claim 6 in which the signal handler adds an address indicative of the detector with which the signal originates and an address indicative of the signal handler which handles that signal.

9. A system according to claim 8 in which the detector address and the signal handler address are added by the same adder.

10. A system according to claim 6 in which a combiner is provided for combining the outputs of one or more of the detectors, the combined signal being conveyed to the signal processor by a serial link.

11. A system according to claim 6 wherein the signal processor comprises:

one or more ports for receiving input signals, the input signals including an indication of origin of the signals;

a time stamper for adding an indication of time to the input signals;

an interface for supplying said input signals to a computer, said input signals including said indication of time and said indication of origin;

said computer processing the input signals to produce information on the input signals or events they represent, the processing of the input signals accounting for the time and origin indications possessed by those input signals.

12. A method of monitoring events in which an event arises as a result of an emission by a radioactive material, the method comprising providing a plurality of detector units in detecting range of the events, each detector unit generating an output signal in response to an event detected by that detector unit;

feeding the signal outputs of the detector units as signal inputs to signal handler, the signal handler generating signal outputs; and feeding the signal outputs of the signal handler as signal inputs to a signal processor, the signal processor processing the signals and generating an output indicative of a characteristic of the events being monitored;

wherein the signal handler adds to the signal outputs of the detectors a signal component indicative of the detector from which the signal arose, the detector signals being combined, the combined signal forming the signal handler signal output.

13. An event monitoring system according to claim 6 in which the signal handler includes one or more discriminators.

14. An event monitoring system according to claim 6 in which the signal handler is provided with one or more output ports and each output port is provided with parallel outputs.

15. An event monitoring system according to claim 14 in which the one or more of the parallel outputs are used for system diagnostic purposes.

16. An event monitoring system according to claim 14 in which the one or more of the parallel outputs are used for safeguard verification.

17. An event monitoring system according to claim 13 in which the discriminator(s) have a threshold parameter which is adjustable and the parameter is adjusted using control signals inputted through the signal handler.

18. An event monitoring system according to claim 13 in which the discriminator(s) have a pulse shaping parameter which is adjustable and the parameter is adjusted using control signals inputted through the signal handler.

19. An event monitoring system according to claim 6 in which the events are gamma rays.

20. An event monitoring system according to claim 6 in which the events are neutrons.

21. A radiation event monitoring system, the radiation event monitoring system comprising:

a plurality of detector units, at least one of the detector units comprising a detector for the events to be monitored and an amplifier to amplify signals generated by the detector, the amplifier being provided within 50 cm of the detector;

a link for conveying the amplified signals to the signal handler, the link being at least 25 meters long;

a signal handler, the signal handler receiving the amplified signals from the detectors, the signal handler including an adder to add to the signals an indication of the detector unit from which the signals originated, a combiner to combine the signals after the addition of the indication and a discriminator for determining which parts of the amplified signals correspond to genuine signals and which parts of the received signals correspond to noise or interference;

a serial link for conveying the combined signals from the signal handler to a signal processor, the serial link being at least 50 meters long; and a signal processor, the signal processor including a signal receiver for the combined signals which include the indication of the detector unit and a computer for processing the signals using software to produce information on the signals or the events they represent, the processing of the signals using the detector unit indications possessed by those signals.

* * * * *